Figure 1:
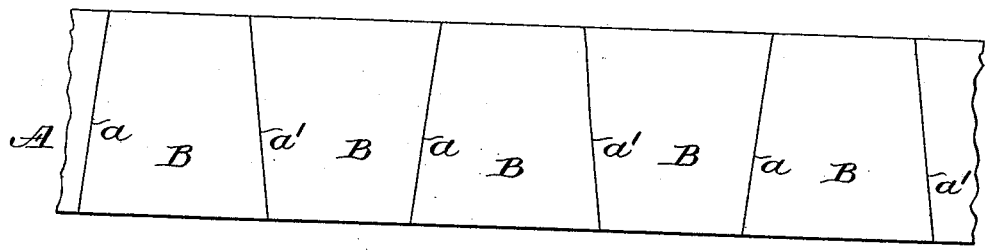

No. 621,852.  Patented Mar. 28, 1899.
W. D. ROWLAND.
METHOD OF MANUFACTURING SHOVEL BLADES.
(Application filed Aug. 3, 1898.)
(No Model.)

Witnesses:
Henry Drury
D. Stewart

Inventor:
William Day Rowland
by his atty.
Francis T. Chambers

THE NORRIS PETERS CO., PHOTO-LITHO., WASHINGTON, D. C.

UNITED STATES PATENT OFFICE.

WILLIAM DAY ROWLAND, OF PHILADELPHIA, PENNSYLVANIA.

METHOD OF MANUFACTURING SHOVEL-BLADES.

SPECIFICATION forming part of Letters Patent No. 621,852, dated March 28, 1899.

Application filed August 3, 1898. Serial No. 687,598. (No model.)

*To all whom it may concern:*

Be it known that I, WILLIAM DAY ROWLAND, a citizen of the United States of America, residing in the city and county of Philadelphia, in the State of Pennsylvania, have invented a certain new and useful Improvement in Methods of Manufacturing Shovel-Blades, of which the following is a true and exact description, reference being had to the accompanying drawings, which form a part thereof.

My invention relates to the manufacture of shovel-blades, and has for its object to simplify and cheapen the manufacture of shovels. In application for Letters Patent filed by me December 2, 1897, Serial No. 660,486, I have described and shown a method of making shovel-blades consisting, essentially, in first forming blanks of substantially one-half the thickness of the finished shovel-blade, then pinning such blanks together in pairs with an interposed layer of flux, raising the composite blank to a welding heat and welding the pair of blanks together without materially decreasing the thickness of the blanks, the manufacture of the shovel-blade being completed by stamping the composite blank to the desired form of the shovel. As heretofore practiced by me this process has involved the use of welding dies or rolls so recessed in parts which come opposite to the socket to be formed in the shovel-blade as to avoid applying pressure at this point, and thus leave those portions of the blanks making up the composite blanks in condition to be opened up by a mandrel to form the socket.

My present invention consists of the improvement upon the method of making shovel-blades above briefly described consisting in interposing between the pair of thin blanks, in addition to the layer of flux, a layer of material adapted to prevent welding, which is interposed between the plates where the handle-socket is to be formed, so that in the subsequent step of welding the two blanks together they can be subjected to the pressure of the dies or rolls throughout without causing a weld at the point to be made into a socket. This improvement in the method enables me to carry on the welding step of the process in plain rolls, which I find to be the most desirable way of effecting the union between the paired blanks.

The interposed layer of material adapted to prevent the welding of the plates at the socket may be of any substance adapted to accomplish this result and may be interposed between the plates in any convenient manner. I have found excellent results by using a thin layer of asbestos cloth, cut to the form of the part to remain unwelded and placed between the two blanks before they are pinned together and heated preparatory to welding. A piece of paper or pasteboard covered on one or both sides with carbonaceous dust may also be used with advantage in the same way, or the layer of carbonaceous dust or other material adapted to prevent adhesion between the plates may be mixed into a viscous liquid with molasses or other convenient material and applied to the face of one of the plates by a pad or stamp of the desired outline and size or by the use of a stamp or a stencil-plate. The portion of one of the blanks which is to remain unwelded may be covered with a gummy liquid and the powdered carbonaceous or other material then sprinkled over it. The result in all cases is substantially the same, and I do not wish to be understood as limiting myself in the claims to any particular way of applying the antiwelding-layer at the desired point.

Figure 2:
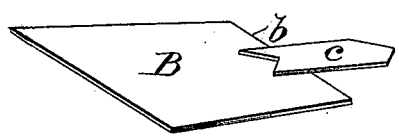
Figure 3:
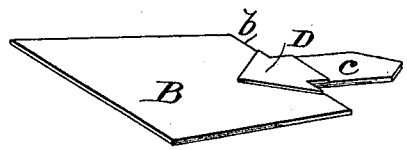
Figure 6:
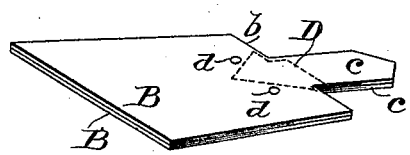
Figure 4:
Figure 5:
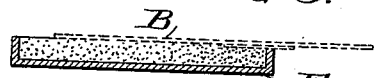
Figure 7:
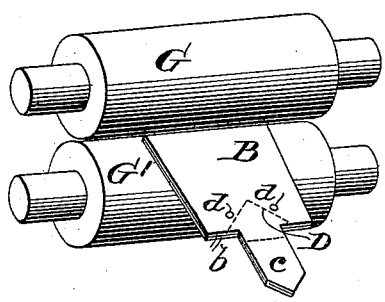
Figure 8:
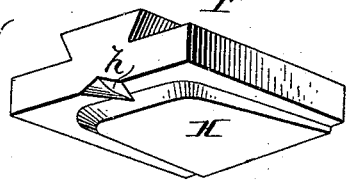
Figure 9:
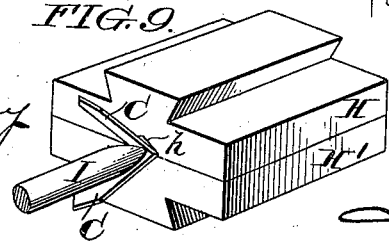

Reference being now had to the drawings, in which I have illustrated my method, Figure 1 is a plan view of a sheet of metal having approximately the thickness of one-half that of the shovel-blade to be made, showing how the blanks may be conveniently cut from such a sheet. Fig. 2 is a perspective view showing a convenient way of forming and applying a tang or strap to such a blade as is indicated in Fig. 1. Fig. 3 is a perspective view illustrating the application of the antiwelding-layer at the part of the blank which is to remain unwelded. Fig. 4 is a sectional view illustrating a convenient way of coating one face of the plate with varnish; Fig. 5, a similar view illustrating how such a varnished face can be coated with flux. Fig. 6 is a perspective view showing two blanks pinned together, with interposed layer of flux and of antiwelding material. Fig. 7 is a perspective view illustrating the operation of welding the plates together into a blank adapted to be made into a shovel-blade. Fig. 8 are perspective views of the upper and lower dies conveniently used for stamping the welded blank into the form of a shovel-blade, and Fig. 9 is a perspective view illustrating the dies as closed together on the blank and the use of a mandrel for opening the straps and forming the socket in the blade.

A indicates a sheet of metal having, as already stated, a thickness equal to approximately one-half of the finished shovel-blade and divided by cuts $a$ and $a'$ into blanks B B B, &c., each having a form of substantially the area of the shovel-blade to be made. These blanks may be cut out, if desired, with the tang or strap formed integral with the plate; but for purposes of economy in the use of material and also because it is generally desirable that the strap of the shovel should be of a milder steel than the blade portion I prefer to form straps such as are indicated at C in Fig. 2 and weld these on the end of the blanks B, the weld being formed on the portion of the blank which in the complete shovel lies on the inside.

A convenient way of applying the layer of flux between the two blanks to be welded together is indicated in Figs. 4 and 5, one of the blanks being first dipped or laid upon the top of a shallow box E, filled with varnish, so as to be coated on one side at least with such varnish, and then this varnished face laid down on a shallow box F of powdered fluxing material, so that a layer of such material will adhere to said face. D indicates the layer of antifluxing material, which is also to be interposed between the two blanks in any convenient way, as above described, and the two blanks are then pinned together, as by means of rivets $d\,d$. (Shown in Fig. 6.) The blade of the composite blank is then heated to a welding temperature in any convenient furnace or manner and then subjected to a welding pressure, which for the best results is applied by rolls in Fig. 7 at G G', the pressure between the rolls being as light as is compatible with the formation of a satisfactory weld. While, as I have stated, the blanks are of substantially the thickness of half of the shovel-blade and while it is an essential part of my invention that they should not be materially reduced in the process of welding, some very slight reduction may occur, accompanied by a slight elongation of the blank; but should this be the case it would occur only at the upper edges $b$ of the blanks, and a very slight trimming of the welded blank on these edges will be sufficient to reduce the composite and welded blank to the desired dimensions. The welded blank is then stamped to shape between the forming-dies H H', which are made with recesses $h$ and $h'$, corresponding to the portion of the composite blank which has not been welded together, and the formation of the socket in this portion of the blank is accomplished by means of a mandrel I, Fig. 9, which is inserted between the strips C C and pressed into the recessed portions $h$ $h'$ of the forming-dies.

Having now described my invention, what I claim as new, and desire to secure by Letters Patent, is—

1. The method of forming shovel-blanks which consists in cutting out blanks of substantially identical form and each of a thickness substantially equal to half that of the finished shovel-blade, then welding the tangs to the blanks, then securing said blanks together in pairs their welded sides lying in contact with a layer of flux between the parts to be welded together and a layer of material adapted to prevent welding interposed between the plates where the handle-socket is to be formed, and then welding the blades of the two blanks together without material reduction in the thickness of the blanks.

2. The method of forming shovel-blades which consists in cutting out blanks of substantially identical form and each of a thickness substantially equal to half of the finished shovel-blade, then welding a tang to each blank, then securing said blanks together in pairs their welded sides in contact with a layer of flux between the parts to be welded together and a layer of material adapted to prevent welding interposed between the plates where the handle-socket is to be formed, then welding the blades of the two blanks together without material reduction in the thickness of the blanks, and then pressing the composite blade to the desired form in dies.

WM. DAY ROWLAND.

Witnesses:
CHAS. F. MYERS,
D. STEWART.